(12) United States Patent
Bock et al.

(10) Patent No.: US 7,406,511 B2
(45) Date of Patent: Jul. 29, 2008

(54) SYSTEM AND METHOD FOR PROCESSING TRANSACTIONS IN A MULTISYSTEM DATABASE ENVIRONMENT

(75) Inventors: Steven Michael Bock, Bainbridge Island, WA (US); Thomas Phillip Bridges, Morgan Hill, CA (US); Richard G. Hannan, Sun Lakes, AZ (US); Steve T. Kuo, San Jose, CA (US); Richard Schneider, San Jose, CA (US); Judy Y. Tse, San Jose, CA (US); Vern Lee Watts, Los Altos, CA (US); Jack Chiu-Chiu Yuan, San Jose, CA (US); Jerome Joseph Zentner, Zephyr Cove, NV (US); Mark Neal Ziebarth, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 1068 days.

(21) Appl. No.: 10/228,148

(22) Filed: Aug. 26, 2002

(65) Prior Publication Data

US 2004/0039777 A1    Feb. 26, 2004

(51) Int. Cl.
*G06F 15/16* (2006.01)
(52) U.S. Cl. .............................. 709/219; 707/2; 707/3; 707/8; 707/9; 707/10; 709/225; 709/226; 718/105
(58) Field of Classification Search .................. 707/2, 707/3, 8–10; 718/105; 709/219, 225, 226
See application file for complete search history.

(56) References Cited

U.S. PATENT DOCUMENTS

| | | | | | |
|---|---|---|---|---|---|
| 5,706,512 | A | * | 1/1998 | Bahls et al. | 707/205 |
| 5,706,513 | A | * | 1/1998 | Bahls et al. | 707/205 |
| 5,797,005 | A | * | 8/1998 | Bahls et al. | 719/314 |
| 5,887,168 | A | * | 3/1999 | Bahls et al. | 719/314 |
| 6,031,978 | A | | 2/2000 | Cotner et al. | 395/200.78 |
| 6,108,689 | A | * | 8/2000 | Fagen et al. | 709/206 |
| 6,138,143 | A | * | 10/2000 | Gigliotti et al. | 718/101 |

(Continued)

OTHER PUBLICATIONS

Rao, C.L., et al., Integrated Cluster Bus Performance for the IBM S/390 Parallel Sysplex, Sep./Nov. 1999, IBM J. Res. Develop., vol. 43, No. 5/6, pp. 855-862.*

(Continued)

*Primary Examiner*—Jeffrey Pwu
*Assistant Examiner*—Alicia Baturay
(74) *Attorney, Agent, or Firm*—John L. Rogitz

(57) ABSTRACT

A system for satisfying a request from a client for a send-then-commit transaction includes a front-end information management system (IMS) server. Shared message queues (SMQ) communicate with the front-end IMS server and plural back-end IMS. The front-end IMS server receives the request from the client and transmits the request to the SMQ. A back-end IMS server accesses the SMQ and generates a transaction output in response to the request. The back-end IMS server transmits the result to the front-end IMS server and the front-end IMS server interfaces with the client to communicate the response thereto. The back-end IMS server and front-end IMS server operate in separate system images, but work together in a resource recovery services (RRS) environment to commit or backout the transaction output.

7 Claims, 3 Drawing Sheets

System Architecture

U.S. PATENT DOCUMENTS

| | | | | |
|---|---|---|---|---|
| 6,141,701 A * | 10/2000 | Whitney | ................ | 710/5 |
| 6,192,369 B1 * | 2/2001 | Doan et al. | ............. | 707/103 R |
| 6,330,582 B1 * | 12/2001 | Kuo et al. | .................... | 718/101 |
| 6,330,686 B1 * | 12/2001 | Denny et al. | .................... | 714/4 |
| 6,571,270 B1 * | 5/2003 | Lai et al. | .................... | 718/101 |
| 6,604,122 B1 * | 8/2003 | Nilsson | ...................... | 718/100 |
| 6,658,485 B1 * | 12/2003 | Baber et al. | ................. | 719/314 |
| 6,681,251 B1 * | 1/2004 | Leymann et al. | ............ | 709/226 |
| 6,842,763 B2 * | 1/2005 | Kettley et al. | ............... | 707/200 |
| 6,862,595 B1 * | 3/2005 | Elko et al. | .................... | 707/10 |
| 6,934,247 B2 * | 8/2005 | Bhattal et al. | ............... | 370/216 |
| 6,944,787 B2 * | 9/2005 | Allen et al. | .................... | 714/4 |
| 6,950,848 B1 * | 9/2005 | Yousefi'zadeh | ............. | 709/203 |
| 6,963,882 B1 * | 11/2005 | Elko et al. | ................. | 707/200 |
| 6,990,513 B2 * | 1/2006 | Belfiore et al. | ............. | 709/203 |
| 6,999,997 B2 * | 2/2006 | Clarke et al. | ................ | 709/213 |
| 7,010,602 B2 * | 3/2006 | Poindexter et al. | .......... | 709/226 |
| 7,035,852 B2 * | 4/2006 | Hopewell et al. | ............. | 707/8 |
| 7,058,632 B1 * | 6/2006 | Ramamurthi et al. | ......... | 707/10 |
| 7,076,551 B2 * | 7/2006 | Gary | .......................... | 709/226 |
| 7,099,935 B2 * | 8/2006 | Jordan et al. | ................ | 709/223 |
| 7,346,935 B1 * | 3/2008 | Ahern et al. | ................ | 719/314 |
| 2002/0124045 A1 * | 9/2002 | Moore et al. | ................ | 709/201 |
| 2002/0169889 A1 * | 11/2002 | Yang et al. | ................... | 709/244 |
| 2002/0174258 A1 * | 11/2002 | Dale et al. | ................... | 709/312 |
| 2003/0110232 A1 * | 6/2003 | Chen et al. | ................. | 709/212 |
| 2003/0115329 A1 * | 6/2003 | Joly et al. | .................... | 709/226 |

OTHER PUBLICATIONS

MQSeries for AS/400 Quick Beginnings, Dec. 2000, International Business Machines Corporation, Version 5 Release 2, pp. i-74.*

* cited by examiner

System Architecture

SYSTEM AND METHOD FOR PROCESSING TRANSACTIONS IN A MULTISYSTEM DATABASE ENVIRONMENT

I. FIELD OF THE INVENTION

The present invention relates generally to computer software, and more specifically to database management software.

II. BACKGROUND OF THE INVENTION

By some estimates, nearly seventy percent (70%) of corporate data in the United States and abroad resides on mainframe computers, e.g., S/390 mainframes manufactured by International Business Machines. Moreover, business-to-business (B2B) e-commerce is expected to grow at least five times faster than the rate of business-to-consumer (B2C) e-commerce. Many transactions involving this corporate data, e.g., bank account data, insurance data, inventory data, archival data, etc. can be initiated by Windows/NT servers, UNIX servers, and other servers but the transactions must be completed on the mainframe using existing legacy applications residing thereon, e.g., information management system (IMS) applications.

Much of this information can be accessed via the Internet using computers. In many cases, the information is accessed and/or updated using a "commit-then-send" process. In a "commit-then-send" process, an IMS server receives an input message from a web client computer. The IMS server processes the input message and completes the change or update requested by the input message. After the input message is processed, the IMS server sends a transaction output to the web client computer. The web client computer does not have an option to commit or backout.

Another process that can be used to access and/or update the IMS information is the "send-then-commit" process. In this process, an IMS server receives an input message from a web client computer. The input message is processed at the IMS server and the resulting output transaction is sent to the web client computer. The web client computer then indicates whether or not to commit to the update or change of the data managed by the IMS server. If commit is indicated, the changes are made permanent. On the other hand, if a backout is indicated, the changes are not made. A typical "send-then-commit" transaction request is processed in only one IMS server. Currently, no method has been provided by which a "send-then-commit" transaction request can be processed simultaneously in two or more IMS servers in order to balance the workload.

Accordingly, there is a need for a system and method which will allow "send-then-commit" transaction requests to be processed in multiple IMS servers.

SUMMARY OF THE INVENTION

A system for satisfying a request from a client for a send-then-commit transaction includes a front-end IMS server communicating with plural back-end IMS servers via plural shared message queues (SMQ). The front-end IMS server receives the request from the client and transmits the request to the SMQ. One or more back-end IMS servers access the SMQ and generating a transaction output in response to the request. The back-end IMS server transmits the result to the front-end IMS server and the front-end IMS server interfaces with the client to communicate the response thereto. The front-end IMS server selectively causes the transaction to commit.

In a preferred embodiment, the front-end IMS server causes the transaction to commit upon successful interfacing with the client to communicate the response thereto, otherwise the front-end IMS server causes the transaction to be backed out. The front-end IMS server is also connected to the back-end IMS servers via a cross-system coupling facility (XCF). Preferably, the back-end IMS server that generates the transaction output uses an input output program communication block (IOPCB) to do so. If the transaction is non-conversational and the size of the transaction output is less than sixty-one kilobytes (61 k), the back-end IMS server transmits the transaction output to the front-end IMS server via the XCF. On the other hand, if the transaction is conversational, the transaction output is transmitted to the front-end IMS server via the SMQ. The transaction output is also transmitted to the front-end IMS server via the SMQ if the transaction is non-conversational and the transaction output is greater than sixty-one kilobytes (61 k).

If the transaction output is transmitted to the front-end IMS via the SMQ, it is first transmitted to the SMQ by the back-end IMS server. Then, the back-end IMS server transmits a notification to the front-end IMS server via the XCF indicating that the transaction output is waiting at the SMQ. The front-end IMS server can then retrieve the transaction output from the SMQ.

In another aspect of the preferred embodiment of the present invention, a method for satisfying a request from a client for a send-then-commit transaction includes receiving the request at a front-end IMS servers. The request is transmitted to the SMQ which is accessed by multiple back-end IMS servers. In this aspect, the request is processed with a back-end IMS server to generate a transaction output. The transaction output is sent to the front-end IMS server. The front-end IMS server attempts to successfully interface with the client to communicate the transaction output to the client. The transaction output is committed if the attempting act is successful.

In yet another aspect of the preferred embodiment of the present invention, a computer program device includes a computer readable means that has logic means for satisfying a send-then-commit transaction request between a client and a front-end IMS server. The computer program device includes logic means for receiving the request at least one front-end IMS servers and logic means for transmitting the request to the SMQ. Further, the computer program device includes logic means for accessing the SMQ with multiple back-end IMS servers and logic means for processing the request with a back-end IMS server to generate a transaction output. The computer program device also includes logic means for sending the transaction output to the front-end IMS server and logic means for attempting to successfully interface with the client using the front-end IMS server to communicate the transaction output to the client. And, the computer program device includes logic means for committing the transaction output if the attempting act is successful.

The preferred embodiment of the present invention will now be described, by way of example, with reference to the accompanying drawings, in which:

DESCRIPTION OF AN EMBODIMENT OF THE INVENTION

Figure 1:
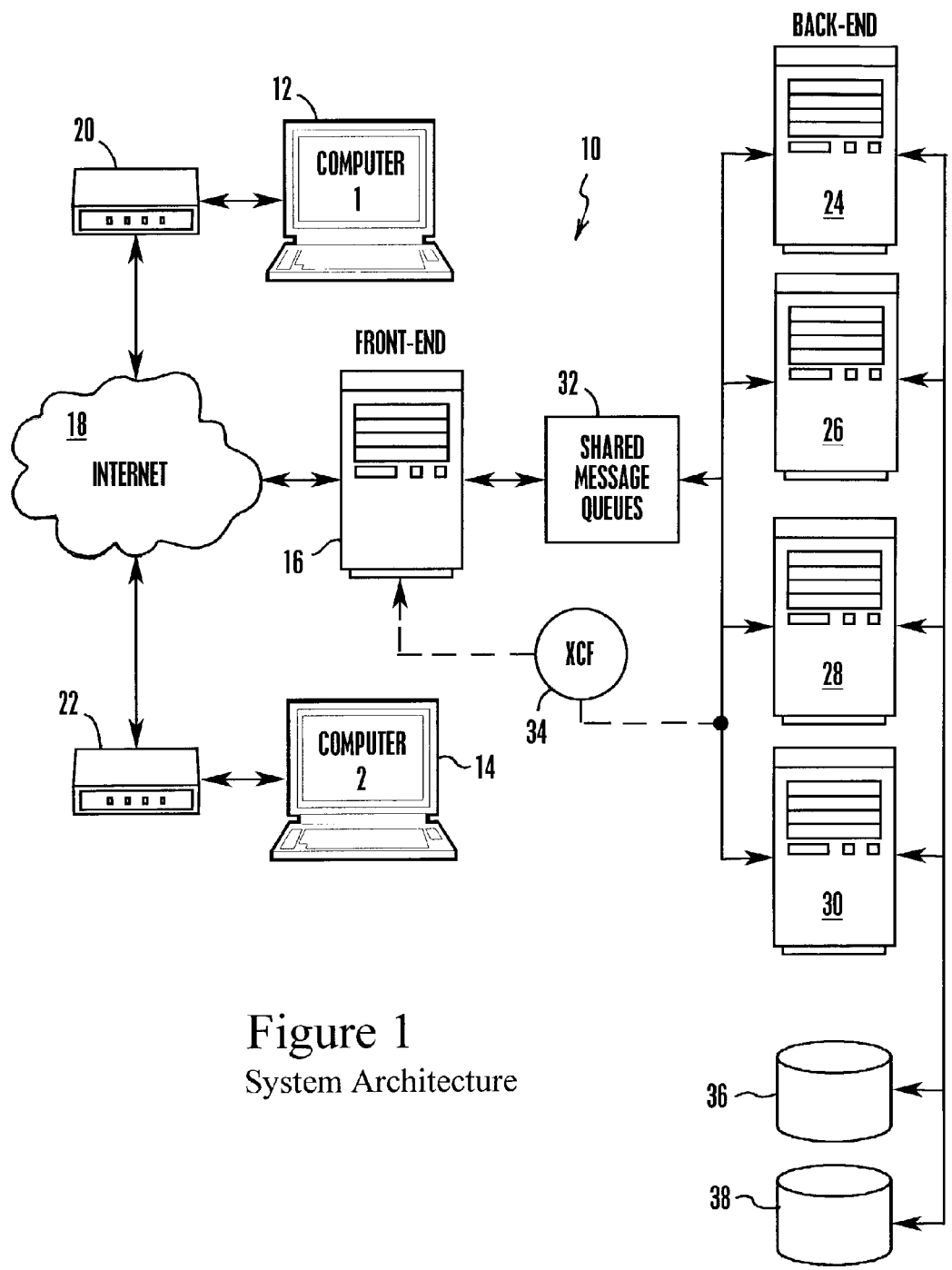
FIG. 1 is a block diagram of the system architecture.

Referring initially to FIG. 1, a system for processing transactions in a multisystem database environment is shown and generally designated 10. FIG. 1 shows that the system 10 includes a first web client computer 12 and a second web client computer 14 that are connected to a front-end IMS server 16. Preferably, the connections between the web client computers 12, 14 and the front-end IMS server 16 are established via the Internet 18, but other connections can be used. Also, as shown, the web client computers 12, 14 connect to Internet 18 via respective modems 20, 22. It can be appreciated that the web client computers 12, 14 can connect to the Internet via other connections, e.g., cable modem, local-area network (LAN), wide-area network (WAN), T1 or any other means well known in the art.

As shown in FIG. 1, the front-end IMS server 16 is connected to a first back-end IMS server 24, a second back-end IMS server 26, a third back-end IMS server 28, and a fourth back-end IMS server 30. It can be appreciated that the front-end IMS server 16 can be connected to more than the four back-end IMS servers 24, 26, 28, 30 shown. FIG. 1 shows that the front-end IMS server 16 is preferably connected to the back-end IMS servers 24, 26, 28, 30 via shared message queues (SMQ) 32. The SMQ 32 allow incoming messages to be stored and shared between the multiple IMS servers 16, 24, 26, 28, 30. Messages received by the front-end IMS server 16 can be transmitted to the SMQ 32. The SMQ 32, in turn, can transmit the messages to one or all of the back-end IMS servers 24, 26, 28, 30. Accordingly, the messages can be processed in whole at one server or in part at multiple servers. The SMQ 32 provide increased capacity and availability on the IMS servers 16, 24, 26, 28, 30. As shown in FIG. 1, the front-end IMS server 16 can also be connected to the back-end IMS servers 24, 26, 28, 30 via a cross-system coupling facility (XCF) 34. The XCF 34 provides functions to support cooperation between authorized programs operating within the IMS servers 16, 24, 26, 28, 30. FIG. 1 further shows that the back-end IMS servers 24, 26, 28, 30 are connected to a first database 36 and a second database 38. It can be appreciated that the back-end IMS servers 24, 26, 28, 30 can be connected to more than the two databases shown in FIG. 1.

While the preferred implementations of the web client computers 12, 14 are personal computers manufactured by International Business Machines (IBM), the computers 12, 14 can be any computers, including Unix computers, or OS/2 servers, Windows NT servers, or laptop computer. (Unix is a registered trademark of The Open Group in the United States and other countries. OS/2 is a registered trademark of International Business Machines Corporation in the United States, other countries, or both. Windows NT is a trademark of Microsoft Corporation in the United States, other countries, or both.) Additionally, the computers 12, 14 can be hand-held computers or any other devices that receive Internet content. Each server 16, 24, 26, 28, 30 can include a series of computer-executable instructions, as described below, that can process transactions in a multisystem database environment.

The instructions may be contained in random access memory (RAM) within each server 16, 24, 26, 28, 30 or on a data storage device with a computer readable medium, such as a computer diskette. Or, the instructions may be stored on a magnetic tape, conventional hard disk drive, electronic read-only memory (ROM), optical storage device, or other appropriate data storage device or transmitting device thereby making a computer program product, i.e., an article of manufacture according to the invention. In an illustrative embodiment of the invention, the computer-executable instructions may be written, e.g., using C++ or Java.

The flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program elements in a form that instructs a digital processing apparatus (that is, a computer) to perform a sequence of function steps corresponding to those shown.

Figure 2A:
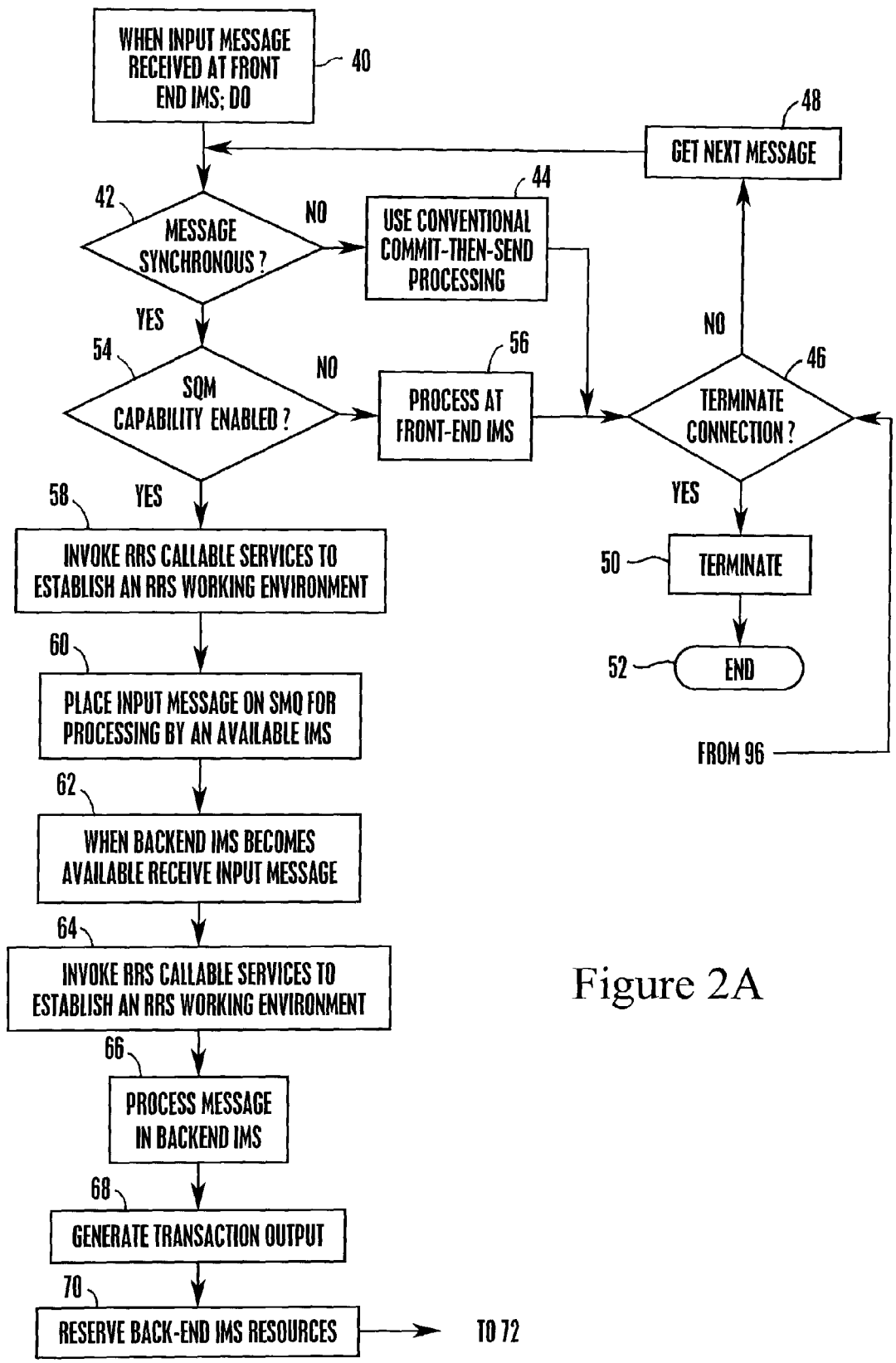
FIG. 2 is a flow chart of the operating logic of the present invention.
Figure 2B:
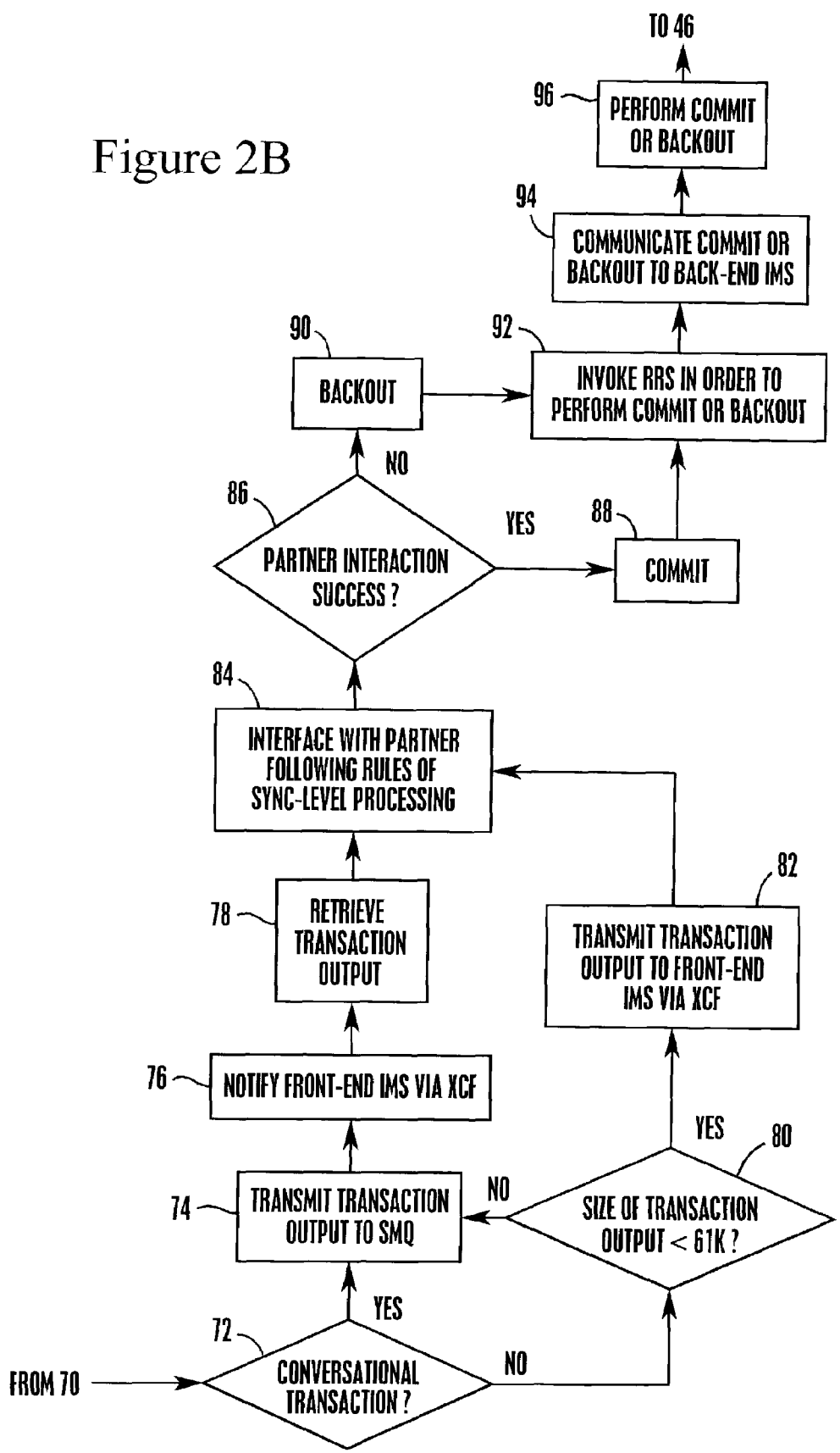

Referring to FIG. 2, the configuration logic of the present invention is shown and commences at block 40 with a do loop, wherein when an input message, e.g., from a web client computer 12, 14 is received, the following steps are performed. It is to be understood that the input message can be a request to access, update, change or otherwise interact with data managed by the IMS servers 16, 24, 26, 28, 30. At decision diamond 42, it is determined whether the input message is synchronous, i.e., whether the message is to be processed using the "send-then-commit" process of the present invention. If the input message is asynchronous, the logic moves to block 44 where the input message is processed following the conventional "commit-then-send" processing rules well known in the art. The logic then moves to decision diamond 46 where it is determined whether to terminate the connection. If not, the logic moves to block 48 where the next message is retrieved and the logic returns to decision diamond 42. If so, the logic terminates the connection at block 50 and then, ends at state 52.

If the input message is synchronous at decision diamond 42, the logic continues to decision diamond 54 where it is determined whether SMQ capability is enabled. If not, the logic moves to block 56 where the input message is processed at the front-end IMS server 16, i.e., the front-end server. The logic then proceeds to decision diamond 46 and continues as described above. At decision diamond 54, if SMQ capability is enabled the logic proceeds to block 58. At block 58, resource recovery services (RRS) callable services are invoked in order to establish an RRS working environment. RRS consists of the protocols and program interfaces that allow an IMS application program to make consistent changes to multiple protected resources. Protected resources are those resources that are considered critical to a company's work. The protected resources, e.g., can include hierarchical databases, relational databases, product-specific resources, etc. It can be appreciated that the integrity of these resources must be protected.

Continuing the description of the logic, at block 60, the input message is transmitted to the SMQ 32 for processing by the next available back-end IMS server 24, 26, 28, 30. At block 62, when a back-end IMS server 24, 26, 28, 30 becomes available, the input message is transmitted from the SMQ 32 to the available back-end IMS server 24, 26, 28 30 where it can be processed. At block 64, once the back-end IMS server 24, 26, 28, 30 receives the input message it invokes RRS callable services to establish an RRS working environment at the back-end IMS server 24, 26, 28, 30.

It is to be understood that at this point, the message synchronization is performed. In other words, as described in detail below, while the front-end IMS server 16 communicates with a partner program, e.g., one residing at the web client computer 12, 14, the input message is processed in one or more of the back-end IMS servers 24, 26, 28, 30 that have access to a database. Thus, once the input message has been fully processed at a back-end server 24, 26, 28, 30 to generate an output transaction, the transaction output can be sent to the SMQ along with XCF notification to the IMS server 16 that the transaction output is available at the SMQ. The front-end IMS server 16 can retrieve the transaction output and send it to the web client computer which can decide whether to commit to the transaction output or backout from the transaction output. The front-end IMS server 16 must then tell the back-end IMS server 24, 26, 28, 30 to commit or backout. It is to be understood that the message synchronization takes place between the front-end IMS server 16 and the back-end IMS servers 24, 26, 28, 30 which run on separate system images. The RRS coordinates the message synchronization between the front-end IMS server 16 and the back-end IMS servers 24, 26, 28, 30.

Continuing to block 66, the input message is processed in one or more back-end IMS servers 24, 26, 28, 30. Next, at block 68 a transaction output is generated using an input output program communication block (IOPCB). Moving to block 70, resources at one or more of the back-end IMS servers 24, 26, 28, 30 are reserved pending receipt of an indication to commit or backout. At decision diamond 72, it is determined whether the current transaction is a conversational transaction, i.e., one that follows a multiple input/output pattern, i.e., input/output, input/output, input/output . . . . It is to be understood that the transaction code, e.g., conversational or non-conversational, is specified in the input message. If the current transaction is conversational, the transaction output is transmitted to the SMQ 32 at block 74. Moving to block 76, the back-end IMS server 24, 26, 28, 30 sends notification to the front-end IMS server 16 via the XCF 34 that the transaction output is waiting at the SMQ 32. The front-end IMS server 16 can then retrieve the transaction output at block 78.

Returning to decision diamond 72, if the current transaction is non-conversational the logic proceeds to decision diamond 80 where it is determined whether the size of the transaction output is less than sixty-one kilobytes (61 k). If not, the logic proceeds to block 74 and continues as described above. At decision diamond 80, if the size of the transaction output is less than sixty-one kilobytes (61 k) the logic proceeds to block 82 where the transaction output is routed to the front-end IMS server 16 via the XCF 34.

Moving to block 84, the front-end IMS server 16 interfaces with a partner program following the rules of sync-level processing. The rules of sync-level processing are the protocol followed for "send-then-commit" interaction between the front-end IMS server 16 and a partner program residing at one of the web client computers 12, 14. Following the rules of sync-level processing, there are three ways to perform the interaction. The first rule is the "None" rule in which the front-end IMS server 16 delivers the transaction output to the partner program at the web client computer 12, 14, but the front-end IMS server 16 does not need any confirmation from the partner program before receiving the transaction output. Second, is the "Confirm" rule in which the front-end IMS server 16 delivers transaction output to the partner program and then waits for confirmation that the partner program received the transaction output. Moreover, the third rule is the "Syncpoint" rule, in which the front-end IMS server 16 delivers the transaction output to the partner program and then waits until confirmation is received from the partner program. The front-end IMS server 16 again waits until RRS notification is received from the partner program. It is to be understood that the "Confirm" rule and the "Syncpoint" rule give the partner program the power to commit to the data or backout.

Proceeding to decision diamond 86, it is determined whether the partner interaction is successful. If so, the logic moves to block 88 where commit is indicated. If not, the logic moves to block 90 where backout is indicated. As shown in FIG. 2, the logic moves from either block 88 or block 90 to block 92 where RRS is invoked in order to perform the commit or backout. Next, at block 94, the commit or backout is communicated to the back-end IMS server 24, 26, 28, 30. Continuing to block 96, the commit or backout is performed. It is to be understood that the commit will cause any changes to the data managed by the IMS servers 16, 24, 26, 28, 30 to be made permanent. Conversely, a backout returns the data managed by the IMS servers 16, 24, 28, 30 to its state prior to the processing of the input message. From block 96, the logic returns to decision diamond 46, where it is determined whether to terminate the connection between the web client computer 12, 14 and the front-end IMS server 16. Preferably, this determination is made by the web client computer 12, 14 or the front-end IMS server 16. Once this determination is made, the logic continues as described above.

With the configuration of structure described above, it is to be appreciated that system and method described above provides a means by which "send-then-commit" transaction requests can be processed in multiple IMS servers 16, 24, 26, 28, 30. Thus, problems associated with a single IMS server crashing are minimized and the workload can be balanced by spreading it across the multiple IMS servers 16, 24, 26, 28, 30.

While the particular SYSTEM AND METHOD FOR PROCESSING TRANSACTIONS IN A MULTISYSTEM DATABASE ENVIRONMENT as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A method for satisfying a request from a client for a send-then-commit transaction, comprising the acts of: receiving the request at at least one front-end IMS server; transmitting the request to at least one SMQ; accessing the SMQ with multiple back-end IMS servers; processing the request with at least one of the back-end IMS servers to generate a transaction output; sending the transaction output to the front-end IMS server; attempting to successfully interface with the client using the front-end IMS server to communicate the transaction output to the client; and committing the transaction output if the attempting act is successful, the client deciding whether to commit to the transaction or backout from the transaction.

2. The method of claim 1, further comprising the act of:
backing out the transaction output if the attempting act is unsuccessful.

3. The method of claim 2, further comprising the act of:
transmitting the transaction output to the front-end IMS server via the SMQ.

4. The method of claim 2, further comprising the act of:
transmitting the transaction output to the front-end IMS server via an XCF.

5. The method of claim 3, wherein the transaction is conversational.

6. The method of claim 3, wherein the transaction is non-conversational and the transaction output is greater than sixty-one kilobytes (61 k).

7. The method of claim 4, wherein the transaction is non-conversational and the transaction output is less dan sixty-one kilobytes (61 k).

* * * * *